Aug. 26, 1969    R. A. CHEVALAZ    3,462,950
CONTINUOUS THROTTLING, SLOT INJECTION, VORTEX ROCKET INJECTOR
Filed March 28, 1966    3 Sheets-Sheet 1

INVENTOR.
ROGER A. CHEVALAZ

BY Thomas W. Brennan

AGENT

Aug. 26, 1969  R. A. CHEVALAZ  3,462,950

CONTINUOUS THROTTLING, SLOT INJECTION, VORTEX ROCKET INJECTOR

Filed March 28, 1966  3 Sheets-Sheet 2

INVENTOR.
ROGER A. CHEVALAZ
BY
AGENT

INVENTOR.
ROGER A. CHEVALAZ
BY
AGENT

United States Patent Office 3,462,950
Patented Aug. 26, 1969

3,462,950
CONTINUOUS THROTTLING, SLOT INJECTION, VORTEX ROCKET INJECTOR
Roger A. Chevalaz, Rockaway, N.J., assignor to Thiokol Chemical Corporation, Bristol, Pa., a corporation of Delaware
Filed Mar. 28, 1966, Ser. No. 540,139
Int. Cl. F02k 9/02; F02g 3/00
U.S. Cl. 60—39.74                                         9 Claims

ABSTRACT OF THE DISCLOSURE

A flow control or throttling device where flow passages are geometrically configured to be opened and/or closed to flow therethrough at a rate proportional to the linear movement of a control element moved over the passages. Included in the invention is provision for one or more control tabs in the flow passages connectable to the control element for movement thereby within the passages.

---

This invention relates to devices for controlling the rate of flow of fluid into a region such as a combustion chamber of a liquod propellant reaction motor or the like, and more particularly to a device known commonly to the art as an injector for the foregoing motors which effects fluid flow control in a continuing fashion for throttling purposes by means of slotted, substantially rectangular, flow passages usually in conjunction with movable control elements which cover the entrances to the flow passages as they are moved thereover. Further contemplated as includable in the scope of the invention are flow tabs insertable in the passages and movable therein in response to the motion of the control elements.

Prior art devices in the field of the herein to be described invention, that is, injectors for admitting one or more propellants into a downstream combustion chamber which incorporate injector face, continuous flow throttling devices, generally employ a pattern of circular, or substantially circular, holes or orifices in the injector face which communicate with a supply of the propellant, and a movable control element which, in response to an external force producing means, covers and uncovers the holes, either partially or entirely, to vary the flow of propellant through the injector passages and ultimately vary, or throttle, the engine thrust.

In liquid bipropellant engines the propellant flow variation is most desirably accomplished under conditions wherein the ratio of one propellant to the other, i.e., the oxidizer to fuel (O/F) ratio, is kept constant over the throttling or operational, range of the engine. However, since in the usual engine, the oxidizer orifice size (diameter) will differ significantly from the corresponding fuel orifice depending on the mixture (O/F) ratio desired and the propellant densities, discrepancies in mixture ratio control are practically unavoidable. As a result highly sophisticated systems for effecting adequate control have necessarily come into existance and have been resorted to.

In contrast, in the injector embodying the invention hereinafter to be described, these discrepancies are eliminated or their effects drastically mitigated and near perfect mixture ratio obtained, as will become more apparent.

In a flow system such as herein contemplated a control element or sleeve is moved over the entrances of a group of flow passages gradually covering or uncovering them depending upon the direction of sleeve movement and its position over the hole or passage entrance. In such a system the rate of change of area $(dA/dx)$, where A is entrance area and $x$ is length of stroke of the control element, of a partially opened orifice is dependent on the relative position (i.e., percent of diameter) of the control element and the size (absolute) of the orifice. Where, as is the usual case, the oxidizer and fuel orifices are of different sizes, mixture ratio control becomes somewhat difficult if not unmanageable. However, with a rectangular slotted passage, area rate of change is dependent only on slot width and independent of the control element relative position (percent of length). Hence practically speaking, perfect mixture ratio conrol becomes obtainable.

In addition, use of the hereinafter described invention, permits precision control even in the most difficult throttling regimes, as for example in the high throttling (low flow rate) regime, whereas in contrast a circular pattern invariably causes aggravated flow rate control problems. In this regime all flowing holes will be, in general, only partially unported. For such instances rate of area change with respect to control element stroke is a maximum at the hole centers and approaches zero at the (closing) edges. Therefore meeting any conceivably desired area schedule versus control element stroke is, at best, difficult. However, the change of area with respect to stroke for the slotted rectangular, port is a constant, and even in these difficult regimes perfect mixture ratio control is relatively easily obtained.

It is therefore, an important object of this invention to provide a device for controlling the rate of flow of fluid into a region such as a combustion chamber of a rocket motor wherein the flow passages are of a particular cross-sectional configuration so that a control element moved in relation to the entrances thereof produces a constant rate of change of passage area with respect to the linear movement of the control element.

It is another object of this invention to provide a device of the character referred to wherein the flow ports are substantially rectangular thus permitting the achievement of a constant rate of area change with respect to the stroke of the control element in substantially all regimes of flow rates.

It is still another object of the invention to provide a device of the character referred to for throttling fluids flowing therethrough wherein movable flow tabs are incorporated within the flow passage and operatively connected to a control element whereby a constant area rate of change with respect to the element stroke is achieved, while simultaneously achieving directional control of the fluid exiting from the passage.

It is yet another object of the invention to provide a device of the character referred to wherein the flow tabs comprise externally extending portions for attachment to the control element to move said flow tabs within the flow passage.

It is an additional object of the invention to provide a device of the character referred to which is incorporated in a rocket motor as the propellant injector and throttling device therefor.

These and other objects will become more readily apparent from the description which follows, it being understood that the invention is not to be construed as limited to the use and embodiments illustrated as many more uses, well within its scope and intention will occur to those skilled in the art of fluid flow control. Therefore the following specification, read together with the accompanying drawings are illustrative of a preferred embodiment shown.

Figure 2:
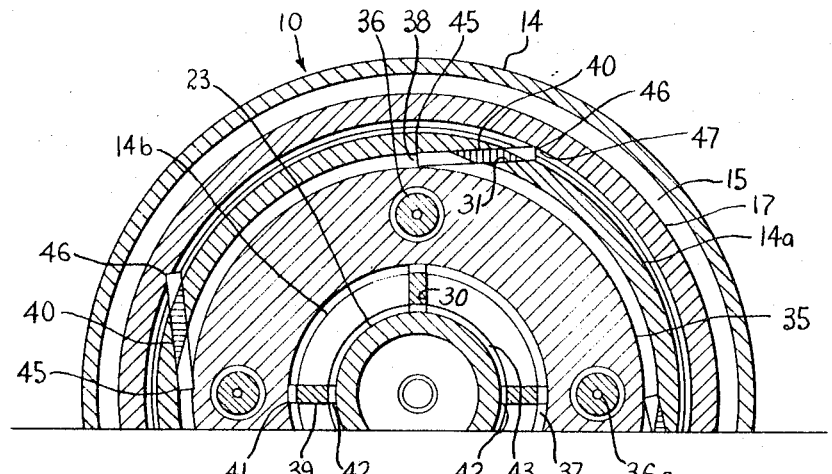
FIGURE 2 is a view taken along the lines 2—2 of FIGURE 1.
Figure 3:
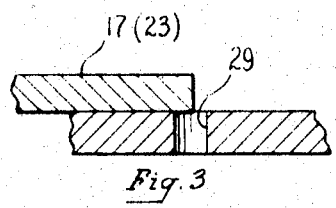
Figure 5:
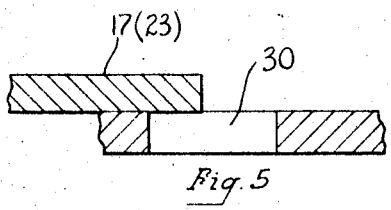
Figure 4:
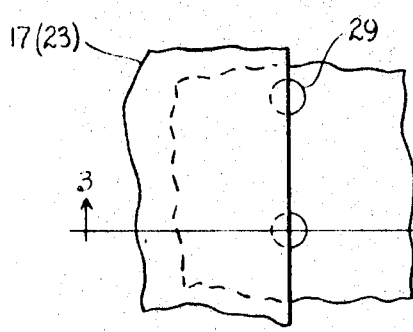
Figure 6:
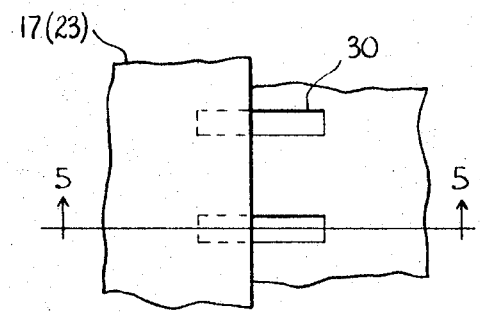
Figure 7:
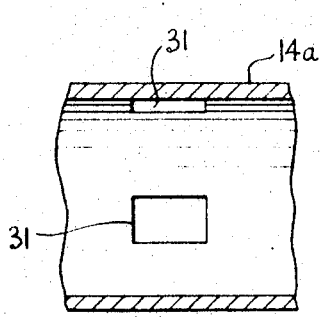
Figure 8:
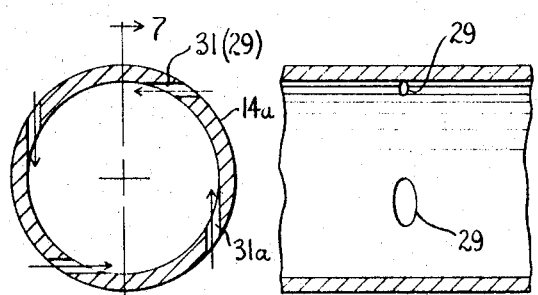
Figure 9:
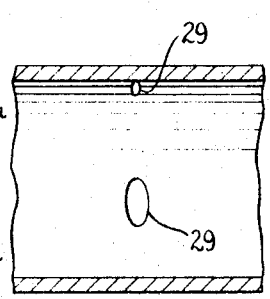
Figure 10:
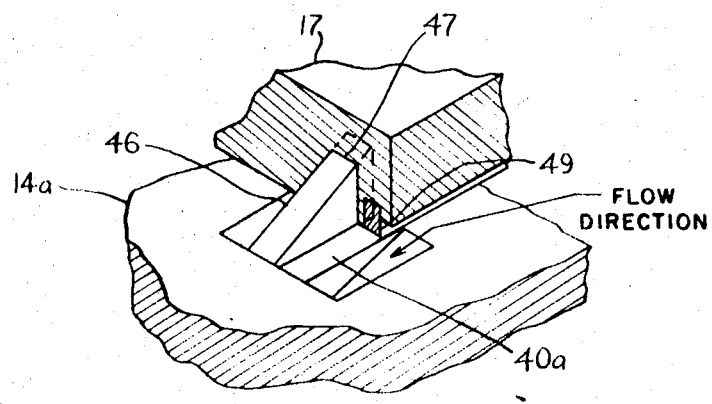
Figure 11:
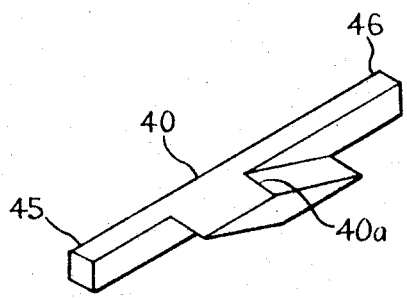
Figure 13:
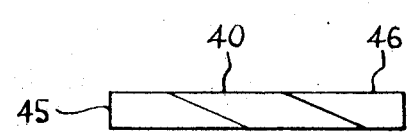
Figure 12:
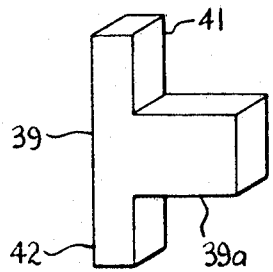
Figure 14:
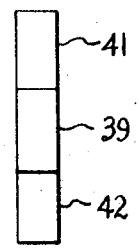
Figure 15:
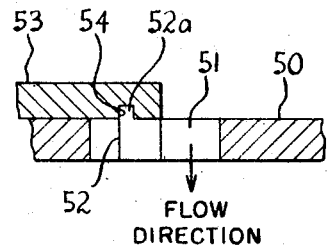

FIGURES 3 and 5 are sectional views of details taken along the lines 3—3 and 5—5 of FIGURES 4 and 6 respectively;

FIGURE 4 is a plan view of a portion of a detail illustrative of a prior art control device;

FIGURE 6 is a plan view of a detail of the invention corresponding to FIGURE 4;

FIGURE 7 is a view taken along the lines 7—7 of FIGURE 8;

FIGURE 8 is a section corresponding to FIGURE 2 wherein certain details are omitted for clarity;

FIGURE 9 is a view similar to FIGURE 7 except corresponding to a prior art device;

FIGURE 10 is a pictorial detail, partially in section, showing one of the flow tabs of the invention illustrative of its operative position in a control device;

FIGURES 11 and 12 are pictorial views of two forms of flow tabs preferred for use in the invention;

FIGURES 13 and 14 are elevational views of the flow tabs of FIGURES 11 and 12 respectively; and, FIGURE 15 is a view similar to FIGURE 5 showing a detail part of another embodiment of the invention.

Figure 1:
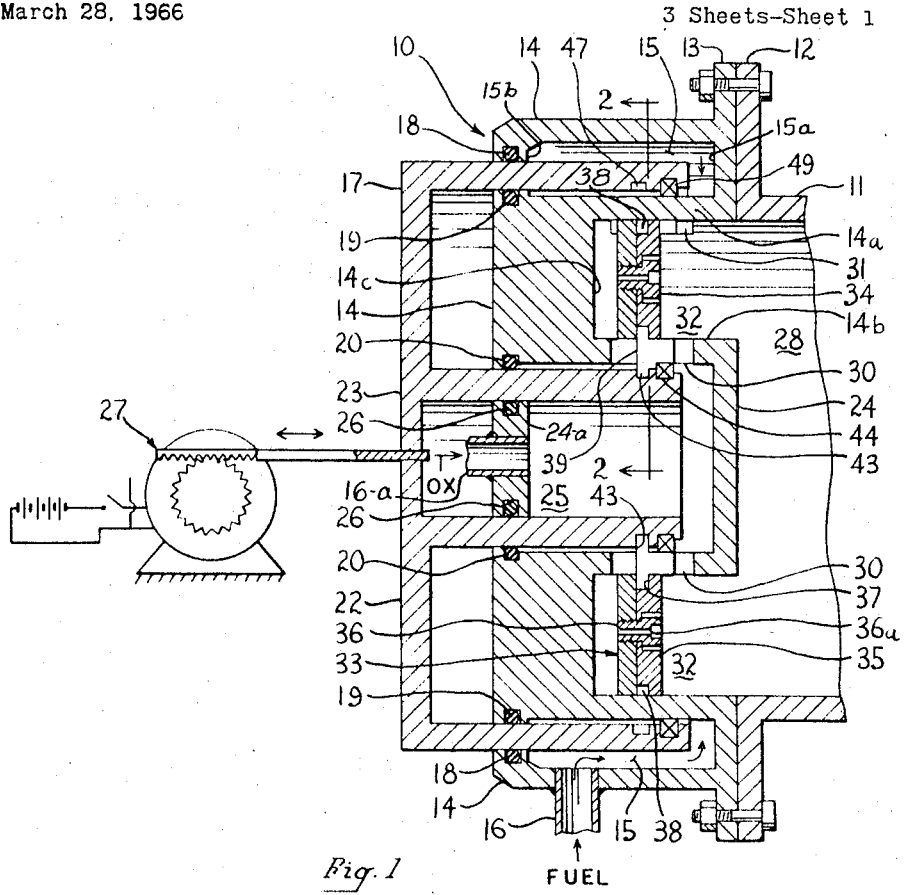
FIGURE 1 is a sectional view of a portion of a head end mounted injector for a reaction motor incorporating the invention wherein two propellants are injected, one radially and one tangentially.

Referring now to the drawings, and in particular to FIGURE 1, a sectional view of a bipropellant rocket motor injector 10 is shown attached to the head end of a combustion chamber 11 by bolts fastened through appropriate holes in the respective flanges 12 and 13. Injector 10 has an outer annular shell 14 having internal annular space 15 defined by vertical walls 15–a and 15–b which communicates through inlet 16 with a supply (not shown) of one of the propellants, the fuel, as indicated in FIGURE 1. Movable within space 15 is an annular control element or sleeve 17, which extends exteriorly thereof. Fluid seals in the form of several O rings 18, 19 and 20 are provided to prevent leakage of propellant from space 15 to the exterior of injector 10. Element or sleeve 17 is moved by any power means well known to the art such as motor driven rack and pinion system 27.

Sleeve 17 is shown integral with an additional element or sleeve 23, however, sleeves 17 and 23 can be made separable and be independently actuated. Element or sleeve 23 also extends into the head end of shell 14 through the forward portion thereof, and defines, with the aft end interior walls 24 and 24–a of shell 14, an internal cylindrical space 25. Space 25 communicates with a source of supply (not shown) of another propellant, the oxidizer, through oxidizer inlet 16–a, as indicated in FIGURE 1. Space 25 is otherwise sealed against fluid leakage by means of O rings 26 and 20. Sleeve 23 is as shown coupled to the motion imparting means, motor-driven rack and pinion system 27 for movement thereby with sleeve 17.

Selection of the fuel and oxidizer propellants for use in the embodiment above described can, of course, be made from any of a broad range of suitable fluids well known to the art and need not be further described here. This invention is concerned with the control of these fluids once selected and supplied to interior spaces 15 and 25. In this aspect of the invention the injector 10 is described hereinafter as one of a class of such devices known to the art as tangential or "vortex" injection systems, i.e., one in which at least one of the propellants is injected into a downstream region such as the interior 28 of combustion chamber 11 through a set or plurality of tangential orifices, and the other substantially radial or perpendicular thereto through a set or plurality of radial holes. In this respect flow passages used in the prior art have invariably been circular or substantially circular in cross section such as orifices 29 (see FIGURES 3, 4 and 9) and control of fluid flowing therethrough has been accomplished by moving elements including devices such as sleeves 17 and 23 in FIGURE 1 over the entrances thereof. However, in the invention herein passages 29 are not circular but are made into a set of slots 30 (FIGURES 1, 2, 5 and 6) and 31 (FIGURES 1, 2, 7 and 8) of rectangular cross section whereby, as will become apparent from what follows, greater precision of flow control both as to quantity and direction is achieved than has heretofore been possible. In addition, control is achieved with considerably less effort, and more importantly, both propellants are controllable in unison, or variably with respect to one another when modified to include a separate power means.

Referring again to FIGURE 1 and to FIGURE 2, annular space 15 is separated from chamber 28 interior by walls or interior structural members 14–a and 14–c of shell 14, and space 25 is separated from chamber 28 by aft end wall 24 and structural member or wall 14–b of shell 14, which contains radially oriented or directed slotted passages 30. Member 14–a contains tangentially directed slotted passages 31. Walls or structural members 14–a and 14–b, together with bulkhead or head end injector annulus 14–c define a head end mixing zone or chamber 32. A tab retainer and idler assembly 33 (FIGURE 1) comprising separable bulkhead or head end plate 34 and retainer or aft end plate 35 is movably positioned in annular mixing zone 32. Plates 34 and 35 are assembled and held together by a plurality of screws 36 containing a vent hole or passage 36–a. Aft end or retainer plate 35 is made with outer and inner peripheral grooves so as to form with plate 34, when assembled, engaging recesses 38 and 37 respectively.

Each radial passage or port 30 in the embodiment shown in FIGURES 1 and 2, is fitted with a movable flow direction or flow control tab 39 which comprises oppositely extending portions or ends 41 and 42, best shown in FIGURE 2, (see also FIGURES 12 and 14) which project exteriorly of passages 30. Similarly, each tangential port 31 (FIGURE 2) is fitted with a flow control tab 40 (see also FIGURES 11 and 13) having oppositely extending ends 45 and 46 which project exteriorly of passages 31.

Sleeve or element 23 contains a peripheral groove 43 in its outer circumference and is provided with a piston ring 44 in ring groove 44–a. Groove 43 is dimensioned to accept in close engagement therewith radial end 42 of each tab 39 (see FIGURE 2). Tab 39 also comprises forwardly projecting shoulder portion 39–a (FIGURE 12) which sealably contacts piston ring 44. Ring 44 also sealably contacts the inner surface of structural member 14–b. Tab 39 also comprises oppositely directed radial end 41 which engages recess 37 in idler assembly 33.

As indicated above, each tangential port or passage 31 in the FIGURE 1 embodiment contains therein a flow control tab 40, which is similar to tab 39 being modified to conform to the dimensional or cross sectional shape of slotted passage 31. Referring to FIGURES 10, 11 and 13, tab 40 comprises oppositely extending ends 45 and 46 and forwardly projecting shoulder portion 40–a (see FIGURE 11).

Sleeve 17 contains a groove 47 in its inner peripheral surface and is provided with a piston ring 49 in ring groove 49–a similar to ring 44 in groove 44–a in sleeve 23. Ring 49 sealably contacts tab 40 at the upper surface of shoulder 40–a thereof (FIGURE 11) and the outer surface of structural member 14–a. Tab 40 ends 46 and 45 project oppositely and exteriorly from each passage 31 and are engaged in sleeve groove 47 and idler assembly recess 38 respectively.

FIGURE 15 is illustrative of a slotted flow passage 51 formed in a valve member 50 such as is used in injector head 10 above, wherein a flow tab 52 is adapted to be fitted in passage 51 and attached to a movable control sleeve or element 53 by means of a single tab end 52–a in appropriate sleeve groove 54.

Operation of the invention, as will hereinafter become apparent, is best described with reference to the invention as embodied in FIGURE 1. It should be understood, however, that the invention is not in any way limited to flow control devices of the particular form shown, but with minor modification and adaptation of its inventive principles well within the skill of the worker in this art, is equally applicable to any fluid flow control system wherein flow is varied in response to variations in the area of the passage through which the fluid flow is being maintained. In addition, where the fluid is being controlled over wide ranges of flows, i.e., high throttling to minimal or no throttling, significantly improved flow control is experienced by the application of the herein described invention.

In FIGURE 1, fluids or propellants, fuel and oxidizers, are supplied to fuel inlet 16 and oxidizer inlet 16-a from appropriate supply sources (not shown) and fill the respective injector 10 internal spaces 15 and 25. In FIGURE 1, it is assumed that propellants are flowing into chamber 28 through injection passages 30 and 31 after mixing and contacting in mixing zone 32. Flow is controlled by moving sleeves 17 and 23 left or right (left to increase, right to decrease) in response to motion of the rack and pinion driven by a reversible motor of motivating system 27. For example, as sleeves 23 and 17 are moved to the right, flow tabs 39 and 40 also move therewith. Since end 42 of tab 39 and end 46 of tab 40 are held in grooves 43 and 47 of sleeve 23 and 17 respectively, flow from annular space 15 and cylindrical space 25 will commence into mixing zone 32 through gradually decreasing (in area) ports 30 and 31 at a decreasing rate as sleeve 17 (and 23 therewith) move further to the right. In addition, idler assembly 33, because of its engagement with tab 39 opposite end 41 and corresponding tab 40 and 45 in peripheral recesses 37 and 38 respectively, also moves to the right and decreases mixing zone 32 volume. This a fortuitous circumstance since the possibility of a large volume between the plane of propellant injection (injection plane) and bulkhead or annulus 14-c, under high throttling (ports 30 and 31 nearly closed) conditions, is eliminated, hence combustion of the propellants is forced downstream into chamber 28 away from the injection ports which might be vulnerable to the heat thereof. By providing vent passages 36-a in screw fasteners 36, the upstream or annulus 14-c, side of retainer and idler assembly 33 is vented to chamber 28 (combustion) pressure thereby avoiding high pressure drop loads on flow tabs 30 and 31 and on idler assembly 33. Thus any rocket motor or engine utilizing the injector of this invention is rendered capable of smooth operation under all operative conditions from an idling (low flow-high throttle) mode, through a full thrust (high flow-low throttling) mode.

Prior to operation of this invention in its preferred embodiment above described, injector 10 is assembled, insofar as the movable parts are concerned, in the following manner (FIGURE 1). Flow control element 17 (together with its connected oxidizer control element 23) is inserted into shell 14 with piston rings 44 and 49 installed thereon. Bulkhead or head end piece 34 of retainer and idler assembly 33 is inserted into annular mixing zone 32 against annulus 14-c. Each flow direction tab 39 and 40 is next inserted into slotted ports 30 and 31 respectively, insuring engagement of their respective ends, 42 and 46 with appropriate grooves 43 and 47 in control sleeves 23 and 17 respectively. Retainer or aft end idler assembly plate 35 is next installed making sure that tabs 39 and 40 opposite ends 41 and 45 are engaged in recesses 31 and 38 respectively. The assembled injector 10 is then installed on combustion chamber 11 and connected thereto by appropriated bolts or other fasteners in flanges 12 and 13.

What is claimed is:

1. A control device for continuous throttling of fluid flowing from an upstream region to a region downstream thereof, comprising, in combination, an outer, pressure resistant shell including internal structural members defining at least one internal fluid containing space, an exteriorly actuated control element in said fluid containing space sealingly contacting and movable over the upstream side of one of said structural members, said contacted member having a plurality of flow passages for passage of fluid from said internal space to said downstream region, each flow passage shaped in cross-section and arranged in said member so that the rate of change of flow area thereof is constant with respect to the motion of said element over said member for throttling said fluid flowing through said passages, at least one flow control tab movably positioned in each of said passages and attached to said element for directionally controlling fluid flowing through said passage, means for imparting motion to said control element, and means connectable to an external fluid source for supplying fluid to said upstream region.

2. The device of claim 1 wherein the cross-sectional shape of said passage is rectangular.

3. A flow control device for continuous throttling of propellant flowing into the combustion chamber of a rocket motor comprising, in combination, an injector shell having at least two internal structural members defining therewith a pair of fluid containing spaces therein, said members each containing a set of slotted fluid passages spaced thereabout for passage of propellant supplied thereto into said chamber, at least one flow control tab movably positioned in each flow passage in each set thereof for directional control of propellant flowing in and exiting from said passage, control means movable over said members and attached to said flow tabs to vary the areas of said sets of slotted passages at a constant rate with respect to the length of stroke of said control means, and means for imparting motion to said control means.

4. The device according to claim 3 wherein at least one set of slotted passages are formed in said member so as to effect a tangential injection of propellant flowing therefrom with respect to the internal surfaces of said combustion chamber.

5. The device of claim 4 wherein the passages in the remaining set are formed in their respective members so as to inject propellant flowing therethrough substantially perpendicular to said tangentially injected propellant.

6. An injector for continuous throttling of propellants injected into a rocket motor for combustion in a combustion chamber thereof comprising, in combination, an annular outer shell including a mounting flange, at least one pair of radially separated substantially concentric internal members integral with said shell, a pair of aft end closures integral with said shell and said members, said shell, members and closures comprising means defining a pair of concentric propellant containing internal spaces, said members each having a set of spaced passages for passage of propellant into the region between said members for mixing thereof, said passages having a substantially rectangular cross-sectional area, a movable control element sealingly insertable into said propellant spaces and adapted to cover and uncover said passages in said members in response to motion imparted thereto, means external to said element for imparting motion thereto, a movable flow control tab positioned in each of said flow passages comprising a portion having opposite ends extending exteriorly of said passage and a portion wholly within said passage, one of said extendible ends attached to said element for movement therewith, movable means positioned in said mixing region between said members and attached to the other of said flow tab extendible ends for movement therewith, and means connectable to said propellant containing spaces for supplying propellant thereto from an external source.

7. The injector of claim 6 wherein the passages of at least one of said sets thereof are formed in their respective member to inject propellant flowing therethrough tangentially with respect to external surface of said combustion chamber.

8. The injector of claim 6 wherein the propellant passages in the remaining set are oriented in their respective member to inject the propellant flowing therethrough substantially perpendicular to said tangentially injected propellant.

9. An injector for a rocket motor having a combustion chamber, in combination, comprising, slotted injection ports for passage of fluid from a fluid supply source into said chamber, means insertable in said slotted ports and movable therein for varying the rate of flow of fluid passing therethrough comprising a plurality of flow tabs at least one in each slotted port having at least one end extendible exteriorly of said port, and control means attached to said exteriorly extending flow tab end for moving said tabs in said ports.

References Cited
UNITED STATES PATENTS

| | | | |
|---|---|---|---|
| 463,623 | 11/1891 | Eichbaum | 137—625.4 |
| 2,810,259 | 10/1957 | Burdett | 60—39.74 |
| 2,995,008 | 8/1961 | Fox | 60—240 |

SAMUEL FEINBERG, Primary Examiner

U.S. Cl. X.R.

60—258; 137—607, 625.4, 625.12; 239—405, 412, 562